United States Patent
Ackerman et al.

(10) Patent No.: US 12,380,188 B2
(45) Date of Patent: Aug. 5, 2025

(54) METHOD AND SYSTEM FOR SEAMLESS BIOMETRIC SYSTEM SELF-ENROLLMENT

(71) Applicant: Princeton Identity, Hamilton, NJ (US)

(72) Inventors: David Alan Ackerman, Hopewell, NJ (US); Kenneth R. Boutot, Philadelphia, PA (US); James DiNapoli, Plainsboro, NJ (US); Paul DuPiano, North Brunswick, NJ (US); Jean-Michel Florent, Villanova, PA (US); Andrew McGalliard, Newtown, PA (US); Erik Myhrer, New Brunswick, NJ (US); Kyle James O'Connor, Philadelphia, PA (US); Sean Singer, Monroe, NJ (US); Bobby Varma, Princeton, NJ (US)

(73) Assignee: Princeton Identity, Hamilton, NJ (US)

( * ) Notice: Subject to any disclaimer, the term of this patent is extended or adjusted under 35 U.S.C. 154(b) by 159 days.

(21) Appl. No.: 17/569,148

(22) Filed: Jan. 5, 2022

(65) Prior Publication Data
US 2022/0253514 A1    Aug. 11, 2022

Related U.S. Application Data

(60) Provisional application No. 63/147,824, filed on Feb. 10, 2021.

(51) Int. Cl.
*G06F 21/32* (2013.01)
*G06F 16/50* (2019.01)
(Continued)

(52) U.S. Cl.
CPC .............. *G06F 21/32* (2013.01); *G06F 16/50* (2019.01); *G06T 7/0002* (2013.01); *G06V 40/70* (2022.01);
(Continued)

(58) Field of Classification Search
CPC ....... G06F 21/32; G06F 16/50; G06T 7/0002; G06T 2207/30168; G06V 40/70
See application file for complete search history.

(56) References Cited

U.S. PATENT DOCUMENTS

| 8,296,573 | B2 * | 10/2012 | Bolle | G06F 21/32 |
| | | | | 713/186 |
| 8,905,763 | B1 * | 12/2014 | Hu | G09B 19/00 |
| | | | | 715/705 |

(Continued)

OTHER PUBLICATIONS

R. P. Wildes, "Iris recognition: an emerging biometric technology," in Proceedings of the IEEE, vol. 85, No. 9, pp. 1348-1363, Sep. 1997, doi: 10.1109/5.628669. (Year: 1997).*

*Primary Examiner* — Alexander Lagor
*Assistant Examiner* — Rupali Dhakad
(74) *Attorney, Agent, or Firm* — Young Basile Hanlon & MacFarlane, P.C.

(57) ABSTRACT

Disclosed herein are methods, apparatus, and systems for seamless biometric self-enrollment. The method including automatically: capturing, by a biometric capture device, biometric modality data for a user in response to a presentation of a user trusted credential for logical access or access to an object during an enrollment process, determining, by an enrollment system, whether biometric modalities for the user are stable, generating a biometric modality template for each unstable biometric modality, replacing a matched stored biometric modality template with the biometric modality template when the biometric modality template is qualitatively better than the matched stored biometric modality template, performing stability accounting when the matched stored biometric modality template is at least qualitatively equal to the biometric modality template, and initiating access processing when at least all biometric modalities are stable and verified.

20 Claims, 5 Drawing Sheets

(51) Int. Cl.
*G06T 7/00* (2017.01)
*G06V 40/70* (2022.01)

(52) U.S. Cl.
CPC .............. *G06T 2207/30168* (2013.01); *G06T 2207/30201* (2013.01)

(56) References Cited

U.S. PATENT DOCUMENTS

| | | | | |
|---|---|---|---|---|
| 2015/0139492 A1* | 5/2015 | Murakami | ........... | G06V 40/168 |
| | | | | 382/103 |
| 2015/0161459 A1* | 6/2015 | Boczek | ................. | G06V 40/10 |
| | | | | 382/115 |
| 2017/0286790 A1* | 10/2017 | Mapen | ................... | G06V 40/50 |
| 2018/0004924 A1* | 1/2018 | Tieu | .................... | G06F 21/6218 |
| 2019/0042835 A1* | 2/2019 | Mostafa | ................. | G06F 21/32 |
| 2020/0005304 A1* | 1/2020 | Almers | ............ | G06Q 20/40145 |
| 2022/0398423 A1* | 12/2022 | Bjerre | ................ | G06Q 20/4012 |

\* cited by examiner

METHOD AND SYSTEM FOR SEAMLESS BIOMETRIC SYSTEM SELF-ENROLLMENT

CROSS REFERENCE TO RELATED APPLICATION

This application is a continuation of U.S. Patent Application Ser. No. 63/147,824, filed on Feb. 10, 2021, the entire content of which is incorporated by reference.

TECHNICAL FIELD

This disclosure relates to biometric systems. More specifically, this disclosure relates to seamless self-enrollment in biometric systems.

BACKGROUND

Biometric systems require users to enroll biometric credentials, e.g., face, irises, fingerprints, that are then matched in subsequent encounters. The enrollment process is a chore, like getting a first driver's license, that uses time and resources, can be inconvenient, cumbersome, and can discourage the use of biometrics. In a typical enrollment session, an attendant or an automated system as in the case of a smart phone, walks the user through the process of enrolling, instructing them in the best practice for presenting their biometric credentials. For a face system, instructions would include removing hats and glasses, not smiling, looking toward the camera, etc. For an iris system, instructions would include removing patterned contact lenses, opening eyes wide, looking at the iris reader, etc. Once acquired, the system assesses the quality of the biometric credentials and, if needed, requests re-enrollment. When the acquired biometric credentials are accepted, they are loaded into an enrollment database and used thereafter. New (probe) images are compared to those enrolled images as a means of biometrically authenticating a person. The enrollment process takes time and often requires a human in the loop, which costs money. Enrollment costs can be very high for a large user database, e.g., for a large university, corporation or for a national register. The time, effort and cost of the initial enrollment process is a disincentive to using biometrics.

Adoption of biometrics to access buildings, premises, items, and the like can be increased by offering systems and methods which mitigate the use of enrollment sessions for a majority of users.

SUMMARY

Disclosed herein are methods, apparatus, and systems for seamless self-enrollment in biometric systems.

In implementations, the method including automatically: capturing, by a biometric capture device, biometric modality data for a user in response to a presentation of a user trusted credential for logical access or access to an object during an enrollment process, determining, by an enrollment system, whether biometric modalities for the user are stable, generating a biometric modality template for each unstable biometric modality, replacing a matched stored biometric modality template with the biometric modality template when the biometric modality template is qualitatively better than the matched stored biometric modality template, performing stability accounting when the matched stored biometric modality template is at least qualitatively equal to the biometric modality template, and initiating access processing when at least all biometric modalities are stable and verified.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
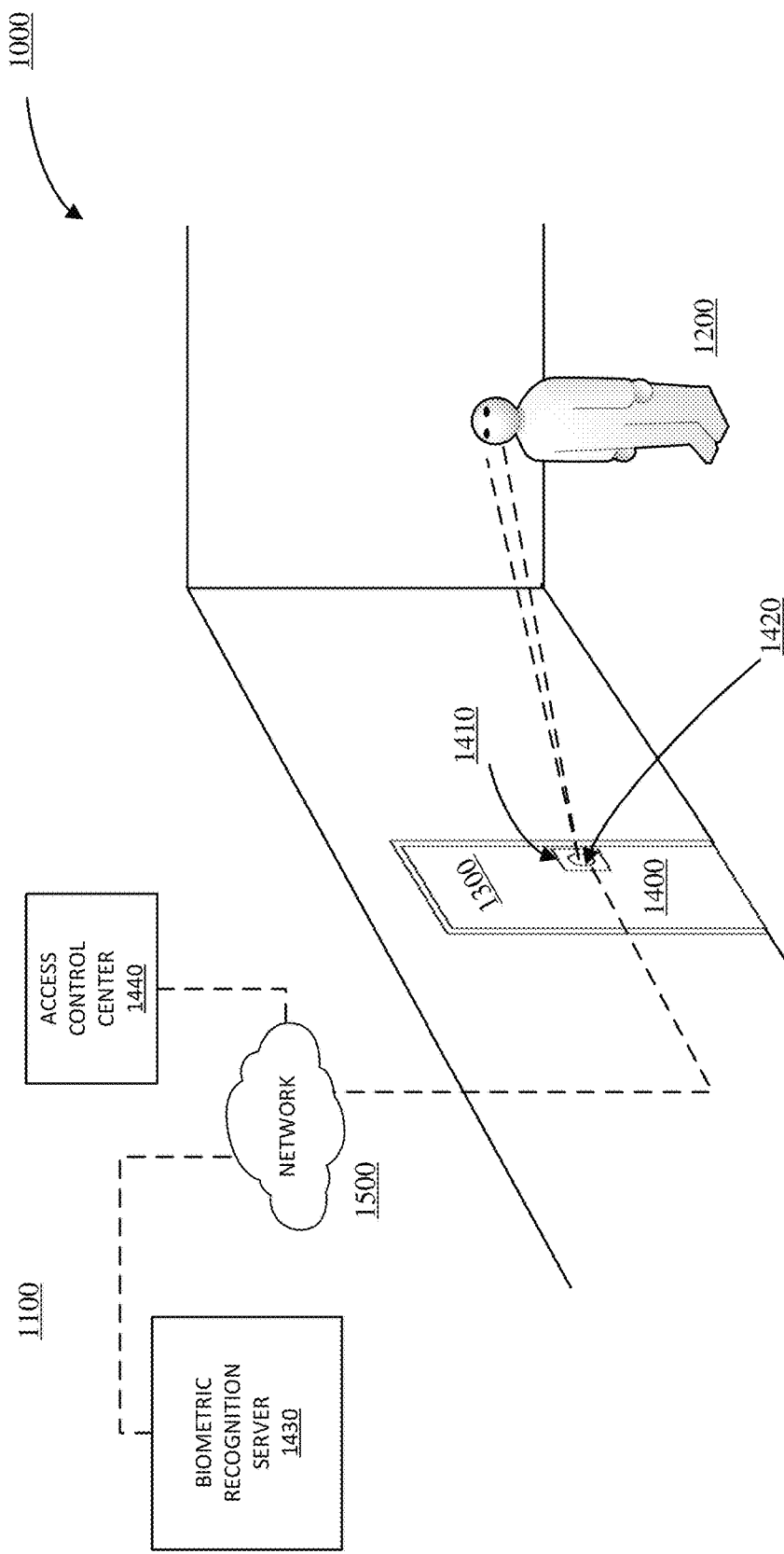
FIG. 1 is a diagram of an example architecture for biometric modality enrollment in accordance with implementations of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for self-enrollment in biometric systems. In implementations, a biometric self-enrollment method has a first-time user of a biometric system first securely verify their identity using one of several trusted credentials including, but not limited to, non-biometric methods. The system acquires a provisional set of biometric credentials starting with attempts on the initial encounter. Then, through a provisional enrollment period, the user's biometric enrollment credentials are systematically improved using an algorithm that compares old enrollments to new probe images, optimizing enrollment quality. In implementations, the provisional enrollment period can be a defined interval, a defined number of enrolled users, a defined percentage of enrolled users, other like or similar metrics, and combinations thereof.

In implementations, a set of stable and/or high quality biometric credentials are established during an open enrollment period. After biometric stability is achieved, identification and access can be transitioned from a trusted credential to a biometric identification. In implementations, two-factor identification can be employed with the original trusted credential augmented by one or more biometric credentials. In implementation, the one or more biometric credentials can include, but is not limited to, face biometrics, iris biometrics, face and iris biometrics, fingerprint biometrics, other like biometrics, and combinations thereof.

In implementations, the biometric self-enrollment system can automatically build up an acceptable set of biometric credentials over a relatively small number of encounters during an initial period and, by so doing, eliminates a separate initial enrollment session and the associated cost, resources, and time required. In implementations, the biometric self-enrollment system can replace the formal, resource intensive enrollment session required to use a biometric recognition system with a period of automated biometric enrollment, transparent to the end-users during which biometric credentials are collected, followed by a transition from identification using an original trusted biometric to some combination of new credentials including the collected biometric credentials. Consequently, the system, lacking a formal enrollment, appears to the user or subject to present a seamless transition from the initial trusted credential to biometric credentials.

In implementations, a user presents an existing trusted credential and attempts access using the biometric system, e.g., engages a biometric capture mechanism such as by looking toward a face and/or iris camera, placing a finger on a capture device, and the like and/or combinations thereof. After a face or iris is acquired, for example, the user can be admitted regardless of the quality of the biometric credential collected based on the existing trusted credential. In subsequent encounters, the acquired face or iris(es) are refined. If a better iris or face is collected, as judged using algorithmic quality metrics, the enrolled biometric credentials are updated. When the provisional period ends using an end criterion, the biometric credentials are either accepted as enrollments or the user is rejected from the system and undergoes a conventional enrollment. It is expected that the latter alternative is a low-probability event.

In implementations, biometric systems find use in a wide variety of settings including low-security university libraries, 24-hour gyms and hotel lobbies, and high-security data centers, military facilities and laboratories. The systems described herein are useful for all low-security applications. In high-security applications, the system can switch from granting partial to granting full privileges only after a user has provided a stable set of biometric credentials as described herein.

FIG. 1 is a diagram of an example architecture of a biometric self-enrollment system 1000 in accordance with implementations of this disclosure. In implementations, the architecture or system 1000 can be deployed, provided, or implemented in warehouses, offices, buildings, residences, hospitals, nursing homes, rehabilitation centers, vaults, airports, concerts, universities, point-of-sale (POS) systems, and other facilities or events. In implementations, the architecture 1000 can include a room or building 1100, which is accessed by a user 1200 via a door 1300. The door 1300 is illustrative of an access controlled facility, object, and the like (collectively "access controlled entity"). The door 1300 can be opened or unlocked by an access control system 1400. In implementations, the access control system 1400 includes a biometric recognition device 1410 and an access control module 1420. In implementations, the biometric recognition device 1410 can be or can include, but is not limited to, one or more of an iris recognition device, a face recognition device, an iris and face recognition device, a fingerprint recognition device, and combinations thereof. In implementations, the access control system 1400 includes the biometric recognition device 1410, the access control module 1420, and a biometric recognition server 1430. In implementations, the biometric recognition server 1430 can be or can include, but is not limited to, one or more of an iris recognition server, a face recognition server, an iris and face recognition server, a fingerprint recognition server, and combinations thereof. In implementations, the access control system 1400 includes the biometric recognition device 1410, the access control module 1420 and an access control center 1440. In implementations, the access control system 1400 includes the biometric recognition device 1410, the access control module 1420, the biometric recognition server 1430, and the access control center 1440. In implementations, the biometric recognition device 1410, the access control module 1420, the biometric recognition server 1430, and the access control center 1440, as appropriate and applicable, are connected or in communication (collectively "connected") using a network 1500. The architecture 1000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The biometric recognition device 1410 can capture an image, a scan, and the like (collectively "captured user biometric data") of the user 1200. The biometric recognition device 1410 can process the captured user data, generate a template, and match the template against enrolled templates to determine if the user 1200 has access. An access signal is generated based on the results of biometric matching. The biometric recognition device 1410 can signal the access control module 1420, the access control center 1440, the biometric recognition server 1430, or combinations thereof. In an implementation, the biometric recognition device 1410 is a standalone device. In an implementation, the biometric recognition device 1410 can communicate with the biometric recognition server 1430 and the access control center 1440 to collectively determine access based on the matching results. In implementations, the biometric recognition device 1410 is an iris recognition device, for example. The iris recognition device can be a touchless and contactless device for recognizing a user. The iris recognition device captures one or more images of the user 1200. The one or more images include an eye comprising an iris and a pupil. The iris recognition device can generate iris templates. The iris templates are matched against enrolled iris templates to determine if the user 1200 has access. An access signal is generated based on the results of the matching. The iris recognition device can signal the access control module 1420, the access control center 1440, an iris recognition server, or combinations thereof. In an implementation, the iris recognition device is a standalone device. In an implementation, the iris recognition device can communicate with the iris recognition server and the access control center 1440 to collectively determine access based on the matching results.

The access control module 1420 can receive the access signal from the biometric recognition device 1410. The access control module 1420 can open or unlock the door 1300 based on the access signal. In implementations, the access control module 1420 can send a signal to a lock/unlock device (not shown) on the door 1300 to open or unlock. In implementations, the access control module 1420 can receive the access signal from the access control center 1440. In implementations, the access control module 1420 can receive the access signal from the biometric recognition server 1430. In implementations, the access control module 1420 can receive the access signal from a combination of the biometric recognition device 1410, the biometric recognition server 1430, and the access control center 1440. In implementations, the access control module 1420 can receive an alarm signal from the biometric recognition device 1410, the access control center 1440, the biometric recognition server 1430, or combinations thereof. In implementations, the access control module 1420 can generate an alarm based on the alarm signal. The alarm can be a light, an audible alarm, a silent alarm, and the like. In implementations, the access control module 1420 is integrated with the biometric recognition device 1410. In implementations, the access control module 1420 is integrated with the door 1300. In implementations, the access control module 1420 is a standalone device in communication with the biometric recognition device 1410, the door 1300, the biometric recognition server 1430, the access control center 1440, or combinations thereof.

The biometric recognition server 1430 can receive the captured user biometric data from the biometric recognition device 1410. The biometric recognition server 1430 can perform biometric recognition for the biometric recognition device 1410. The biometric recognition server 1430 can communicate alarms and results to the biometric recognition device 1410, the access control module 1420, the access control center 1440, or combinations thereof.

The access control center 1440 can be smart monitors, smartphones, computers, desktop computers, handheld computers, personal media devices, notebooks, notepads, tablets, and the like which can communicate between the biometric recognition device 1410, the access control module 1420, the biometric recognition server 1430, or combinations thereof. The access control center 1440 can review the results from the matching by the biometric recognition device 1410, the biometric recognition server 1430, or combinations thereof to determine what access signal should be sent to the access control module 1420. In implementations, the access control center 1440 can receive an alarm signal from the biometric recognition device 1410, the biometric recognition server 1430, the access control module 1420, or combinations thereof. In implementations, the access control center 1440 can generate an alarm based on the alarm signal. The alarm can be a light, an audible alarm, a silent alarm, and the like.

The network 1500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

Figure 2:
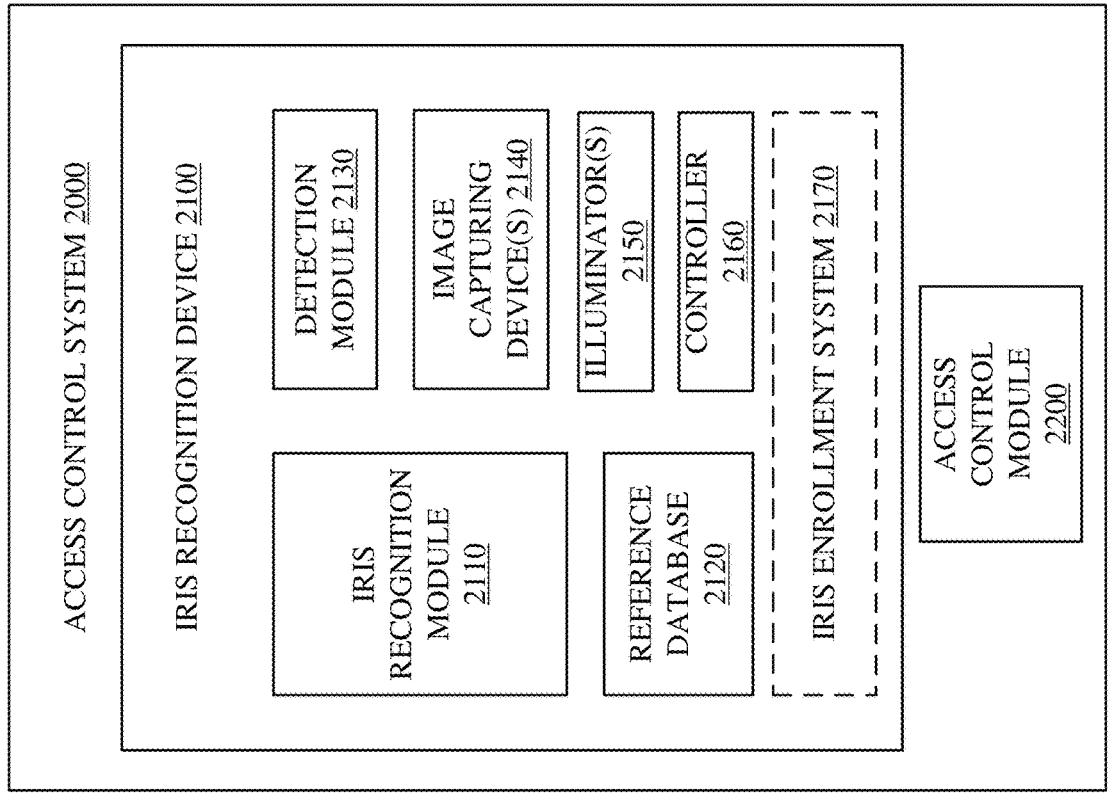
FIG. 2 is a diagram of an example access control system with example biometric modality recognition devices in accordance with implementations of this disclosure.

FIG. 2 is a diagram of an example access control system 2000 with an example iris recognition device 2100 in accordance with implementations of this disclosure. In implementations, the access control system 2000 can include face recognition device, iris and face recognition device, fingerprint recognition device, and/or other biometric recognition devices. In implementations, the access control system 2000 is illustrative and other biometric-based recognition devices, servers, and modules can be used without departing from the scope of the specification and claims. The access control system 2000 can include the iris recognition device 2100 in communication with an access control module 2200. The iris recognition device 2100 can include an iris recognition module 2110, a reference database 2120, a detection module 2130, one or more image capturing device(s) 2140, one or more illuminator(s) 2150, and a controller 2160.

The detection module 2130 can be a motion sensor, a proximity sensor, and like device which can determine the presence of an individual or whether an individual is proximate to an access controlled entity. The detection module 2130 can awaken or signal the access control system 2000, the iris recognition device 2100, or combinations thereof of the presence of the individual. In implementations, the access control system 2000 can be in a low power mode or on persistently to perform scanning. Activation of the access control system 2000 occurs when the scanning finds a scannable object.

The one or more image capturing device(s) 2140 can be a camera, an imager, or like device for capturing one or more images of the individual. In implementations, the one or more image capturing device(s) 2140 is a near infrared image capturing device, a visible image capturing device, or combinations thereof.

The one or more illuminator(s) 2150 can be one or more light sources, light emitting diodes, and the like which can illuminate the individual in coordination with capturing an image of the individual. In implementations, the one or more illuminator(s) 2150 can be visible light sources including ambient light, visible light emitting diodes (LEDs), near infrared light sources including ambient light, near infrared light emitting diodes (LEDs), and the like.

The iris recognition module 2110 can perform iris recognition on the captured images as described herein. In implementations, the iris recognition module 2110 generates appropriate or applicable iris templates, representations, or the like, and matches the iris templates to enrolled templates stored in the reference database 2120. The iris recognition module 2110 can send matching results to the access control module 2200. In implementations, the results can be scores, a decision, or combinations thereof. If a spoof is detected, an alarm can be generated or an alarm signal can be sent as described herein.

The reference database 2120 can include iris templates, and other like templates for individuals enrolled in the access control system 2000.

The controller 2160 can control and coordinate the operation of the detection module 2130, the one or more image capturing device 2140, the one or more illuminator(s) 2150, and if applicable, an iris enrollment system 2170.

The iris enrollment system 2170 can enroll individuals into the access control system 2000 as described herein. The one or more image capturing device(s) 2140 and the one or more illuminator(s) 2150 can capture images of individuals which are processed by the iris recognition module 2110 to generate iris templates as described herein. The iris templates can then be stored in the reference database 3120 for matching analysis by the iris recognition module 2110 as described herein. In implementations, the iris enrollment system 2170 can include a provisional or enrollment database which can be used for seamless enrollment as described herein.

The access control module 2200 can receive matching results from the iris recognition device 2100. If a positive match occurs, the access control module 2200 can open or unlock the access controlled entity for the individual or send a signal to the access controlled entity, which in turn can cause the access controlled entity to open or unlock. In implementations, the access control module 2200 can access other security systems to determine security, access, authorization levels or the like for a matched individual. That is, the iris recognition is one of multiple steps in providing access to a secured asset. The access control module 3200 can receive alarm signals as described herein and process accordingly.

In implementations, the iris recognition device 2100 can include the iris enrollment system 2170. In implementations, the iris recognition device 2100 and the access control module 2200 can be an integrated device. In implementations, the iris recognition device 2100 and the access control module 2200 can be connected standalone devices. The access control system 2000 may include other elements, which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
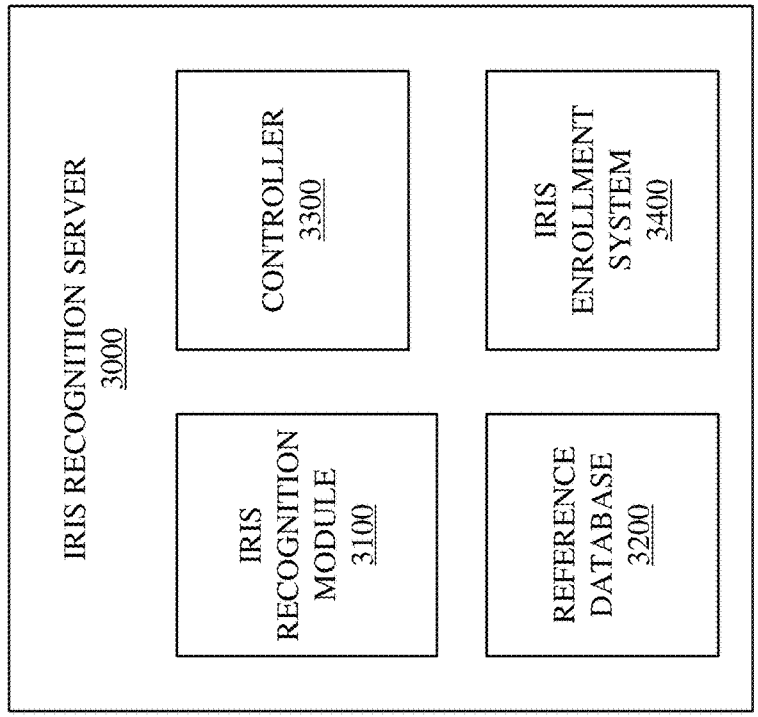
FIG. 3 is a diagram of an example iris recognition server for use with the access control system of FIG. 2 in accordance with implementations of this disclosure.

FIG. 3 is a diagram of an example iris recognition server 3000 for use with the access control system of FIG. 2 in accordance with implementations of this disclosure. The iris recognition server 3000 can include an iris recognition module 3100, a reference database 3200, a controller 3300, and an iris enrollment system 3400. The iris recognition server 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein. The iris recognition server 3000 can communicate with the access control system 2000, the iris recognition device 2100, the access control module 2200, and combinations thereof via a network such as network 1500. The iris recognition module 3100 can operate as described for iris recognition module 2110. The reference database 3200 can operate as described herein for the reference database 2120. The controller 3300 can control and coordinate the operation of the iris recognition device 2100, the access control module 2200, the iris recognition module 3100, the reference database 3200, the iris enrollment system 3400, and combinations thereof. In implementations, the iris recognition server 3000 can include a provisional or enrollment database as described herein.

Figure 4:
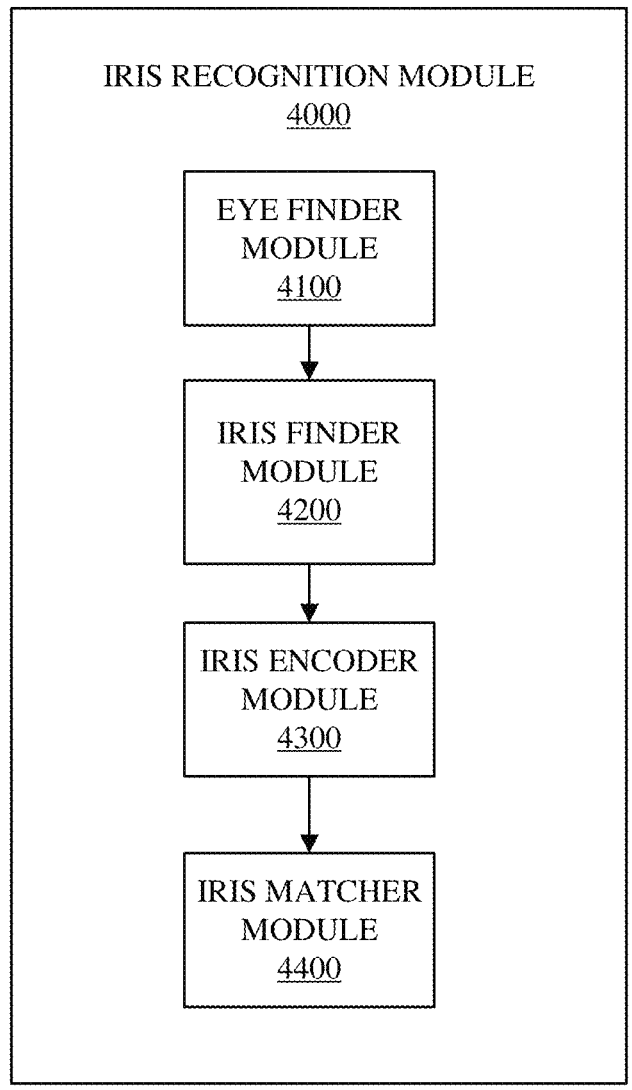
FIG. 4 is a diagram of an example configuration of an iris recognition device in accordance with implementations of this disclosure.

FIG. 4 is a diagram of an example iris recognition module 4000 in accordance with implementations of this disclosure. In implementations, the iris recognition module 4000 is the iris recognition module 2110 in FIG. 2 and the iris recognition module 3100 in FIG. 3. The iris recognition module 4000 can include an eye finder 4100, an iris finder module 4200, an iris encoder module 4300, and an iris matcher module 4400. The iris recognition module 4000 can process image(s) of a user. The eye finder module 4100 can locate or find one or more eyes of a subject in the image(s) that contains at least an appropriate portion of a face of the subject using conventional techniques. An appropriate portion can refer to having on or more landmarks to determine the one or more eyes of the subject. The iris finder module 4200 can operate on or process the located eyes for the image to find the iris(es) using conventional techniques. The iris finder module 4200 segments the iris from the pupil using conventional techniques. The iris encoder module 4300 can encode the segmented iris using conventional techniques. The iris encoder module 4300 can generate a digitized iris template from the encoded iris. The iris matcher module 4400 can compare the iris template(s) against iris enrolled templates and provide iris match scores. The iris matcher module 4400 can check that the iris patterns match to enrolled iris images. The iris matcher module 4400 can reject the subject and generate an alarm or can accept the subject as legitimately recognized.

In a system overview, there are three underlying subsystems. The first subsystem comprises an access control system configured to accept a trusted credential to verify the identity of a first-time user. This subsystem can use a variety of conventional means including but not restricted to RFID cards, interactions using smartphone apps, etc. In implementations, any trusted credential can be used. The second subsystem comprises a biometric capture system, e.g., a face or iris reader, which photographs a face or irises, judges their quality using a set of preset criteria and encodes the images into templates that are mathematical representations of the biometric images that can be matched to other templates of either the same credential (ideally producing an authentic match) or a different one (ideally producing an impostor non-match). In implementations, the biometric can include, but is not limited to, face, iris, fingerprint, palmprint, palm-vein pattern, eye-vein pattern, periocular face region, voice, etc. The third subsystem is the enrollment control subsystem which starts by initializing a subject's enrollment using a preset trusted credential, directs the first and second subsystems to acquire biometric credentials during the initial encounter, decides whether to accept the initial biometric enrollments and, without intervention, refines the user's biometric enrollment. The third subsystem also decides if a user has failed to enroll biometric credentials after a provisional period and, if so, intervenes, either restarting the process or rejecting the user thereby forcing them to use a conventional enrollment process. In implementations, the criteria for ending/not ending an enrollment process, reaching a stable biometric credential, and processing of rejected users can be handled using a variety of metrics, processes, and the like without departing from the scope of the specification or claims.

Table 1 is an illustrative overview of a seamless biometric enrollment process. The items listed in Table 1 are not exhaustive. In implementations, the first time user can present a pre-existing biometric credential or mode in route to enrolling a different biometric mode. In implementations, during Nth encounter, subject can present non-biometric or pre-existing biometric credential, e.g., face as before, and subject can be admitted on basis of the pre-existing biometric credential. In implementations, a subject can be provided instructions or status during the process.

TABLE 1

| Initial encounter | Nth encounter during provisional enrollment period | End of provisional enrollment period | System in steady state |
| --- | --- | --- | --- |
| Subject presents trusted credential (non-biometric, e.g., card, or already established biometric) | Subject presents trusted credential and, as usual in the enrollment period, presents biometric sample(s). | Subject presents trusted credential and final biometric sample. | Enrolled users present biometric (1-factor) or 2-factor credentials. |
| System provides automated instructions on how to present a biometric sample, e.g., 'Look here.' | System evaluates quality of newly provided biometric data. | System updates biometric records and evaluates stability as before. | System administrator decides whether new users enroll using proposed 'seamless' procedure or by conventional means depending on available resources. |
| Subject presents biometric sample, e.g., looks toward face or iris camera. | If above a quality threshold, biometric data are compared to other biometric data collected in the enrollment period. | If new biometric collection is stable, subject is informed directly or by alternate channel that they are enrolled. | Administrator decides whether to update biometric credentials periodically or to use biometric credentials collected in provisional enrollment period permanently. |

TABLE 1-continued

| Initial encounter | Nth encounter during provisional enrollment period | End of provisional enrollment period | System in steady state |
|---|---|---|---|
| Newly acquired biometric data are evaluated for quality and assigned a scalar or vector quality metric. | If of threshold quality and if no biometric data yet exist, new data are recorded. If data exist, new data are compared with existing and better data are retained. | If subject is enrolled, they may present biometrics only (1-factor) or trusted credential and new biometric (2-factor) to gain access. | |
| System admits subject based on trusted credential. | Stability of biometric samples is measured and recorded. | If subject fails to enroll during open period, they are instructed to follow alternative procedure. | |
| The provisional enrollment period begins. | Subject is admitted based on trusted credential. | | |

In an operational overview with reference to FIGS. 1-4 and Table 1, a first time user (not yet enrolled) presents a trusted credential in the form of a pre-existing RF identification card or a one-time QR code obtained in advance of the first encounter with the access control system 1400. This initiates an enrollment window, period, or the like over which the access control system 1400 obtains or collects user biometric data samples until a final, stable set of enrollment credentials is established as described herein.

For purposes of a non-limiting illustration, the biometric described herein is iris. In implementations, one or more biometrics can be captured and established. In implementations, an enrollment system such iris enrollment system 2170 and/or 3400 can control or manage the enrollment process. For example, the first-time user can look into the iris recognition device 2100, which successfully captures a good left iris image and an unacceptable poor right iris image. In the next encounter, the iris recognition device 2100 might recognize the user using the previously collected left iris while collecting a good right iris. The system 1400 would replace the unacceptable right iris image that it collected on the first encounter, thereby completing the iris enrollment process. Thereafter, the user could be recognized by matching left and right probe irises to enrolled irises and would no longer need to require the original trusted credentials. In implementations, the system 1400 might operate with two-factor identification in which both the original trusted credential and biometric credentials were required. In implementations, the system 1400 can collect a face image on each encounter that could be used in a multi-modal biometric recognition system that required iris and face credentials for added security. In implementations, the system 1400 can be combined with a non-biometric credential.

The system 1400 mitigates use of a conventional enrollment process for a majority of the users. The enrollment process for a premise can terminate in a number of ways. The system 1400 can determine when each biometric credential of each subject has reached an acceptable level, i.e., has stabilized. For example, at some point, the system 1400 can determine that the left iris enrollment template of subject A has stabilized. Soon thereafter, the right iris template of the same subject stabilizes. At this point, the system 1400 can allow subject A to identify themselves by iris recognition only, or by a two-factor combination of card and iris. While a stable face might still be missing for subject A, the enrollment period for subject A can be concluded while still further face templates are recorded for use. In implementations, the system 1400 can wait until all iris and face templates are stable before allowing subject A to transition from the original mode of identification to the new mode. In implementations, a fixed period might elapse during which all subjects refine their biometrics while using the original method of identification. At some point in the enrollment window of the premise, some subjects might have fully stable biometric enrollments while the enrollments of other subjects still require refinement. When the enrollment period for the premises ends, the new mode of identification is enabled for all subjects. In implementations, other end points can be used that establish the one, a group, or all subjects have biometric enrollments that are usable. In all cases, the end of the enrollment process might leave a small minority of subjects with inadequate biometric credentials. These subjects can be allowed to continue to use the system in its original form, for example, presenting RFID cards if their irises are not appropriate for an iris recognition system. In implementations, subjects yet to be fully enrolled with biometric credentials might be enrolled in the conventional way using a formal enrollment process. For example, after the proposed enrollment of irises and face for 10,000 employees of a large enterprise, 25 employees might have inadequate iris templates. Of these 25, 22 can be enrolled in a conventional process while 3 blind employees can use their company-provided RFID cards and face biometrics only to use the system thereafter. In implementations, the system 1400 can define which biometrics to capture for certain subjects.

In an operational description with reference to FIGS. 1-4, a user presents a trusted credential to the system 1400, e.g., an RFID card or one-time QR code, a PIN, a click on a link, interaction with a mobile app, phone with Bluetooth or NFC, interaction via SMS or email, or an existing biometric. In implementations, a portrait image can be used for enrollment. The users can be instructed to present their credentials using instructions supplied by any of a number of means, prior to the encounter, for example, a company distributed video message. Information about a transition from the original identification to the new system can be included in messaging to the subject population prior to engagement.

During the initial encounter, the user presents biometric credentials, e.g., a face and/or irises, using any provided instructions. To ensure proper presentation of biometric credentials, the system 1400 might offer the user feedback, e.g., 'move closer to the camera' or 'take off your hat.' In addition, the identification device might include a monitor with the image of the subject or a mirror to attract the gaze of the subject.

The system 1400 can enroll the first-time user along with their biometric credentials, whether or not the biometric credentials satisfy the minimum quality requirements for the biometric samples or even if no biometric data are collected.

For example, the system 1400 might acquire right and left iris images but the right iris image might be unacceptable as an enrollment image. The biometric enrollment step is fast because it does not demand a high-quality biometric sample. The system 1400 works on the principle of 'better luck next time,' where after multiple user biometric data captures, the system 1400 will have stable biometrics for most users. In implementations, the system uses one set of captured user biometric data for initialization. In implementations, the system uses one or more sets of captured user biometric data for initialization.

On the next encounter, the system 1400 attempts to match the user with the provisional biometric credentials. If successful, the biometric credential is updated, for example in the reference database 2120 or 3200, with the better samples of the initial and second encounter. If no match, the user must use their non-biometric credential and capturing of the user's biometric data is repeated at next access attempt. In implementations, for added security through the provisional period, the system 1400 can request both biometric and non-biometric credentials, dependent upon the needs of the system. The capture and test refines the biometric credential(s) with each subsequent encounter.

The user continues to upgrade their biometric credential with continued use until the enrollment process ends. In implementations, the enrollment endpoint can be the single biometric credential, e.g., iris, being considered stable, ending the provisional period for a particular subject. In implementations, the enrollment endpoint can be a set of biometric credentials being considered stable for a particular subject, e.g., two irises or two irises and a face. In implementations, the enrollment endpoint can be a preset period which ends and subjects with one or more stable biometric enrollments transition to the new system. In implementations, the enrollment endpoint can be when a system administrator is alerted that an acceptable fraction of subjects have stable biometric credentials enrolled. In implementations, the enrollment process continues without end, refining biometric enrollments, constrained by stability criteria to avoid confusing one subject with another. In implementations, biometric credential stability can be based on a quality score.

In the event that a subject's biometric enrollment is considered unstable at the end of an enrollment period, the system administrator can request that the user undergo a conventional enrollment. It is assumed that use of conventional enrollment is an infrequent occurrence. During this process, a system administer can advise individual subjects that they are biometrically enrolled and can start using the system using the required set of credentials.

The system 1400 described herein builds up a high-quality biometric credential for a user over a provisional period. As the credential improves, the effectiveness of the system to recognize the user improves as does the system security. There are alternative ways to end the enrollment period as described herein. In implementations, a user is granted full privileges after the first encounter. In implementations, a user is granted full privileges only at the close of the provisional period. In implementations, a user is granted some set of privileges during a period when they must present both the original trusted credential and provisional biometric credentials and full privileges when the biometric credentials are considered stable and they no longer need to use the non-biometric credential. In implementations, a user will always need to present multi-factor credentials including non-biometric and biometric for enhanced security multi-factor authentication. In implementations, requirements for levels of access, e.g., full, partial, and/or the like can be defined in the system 1400.

Figure 5:
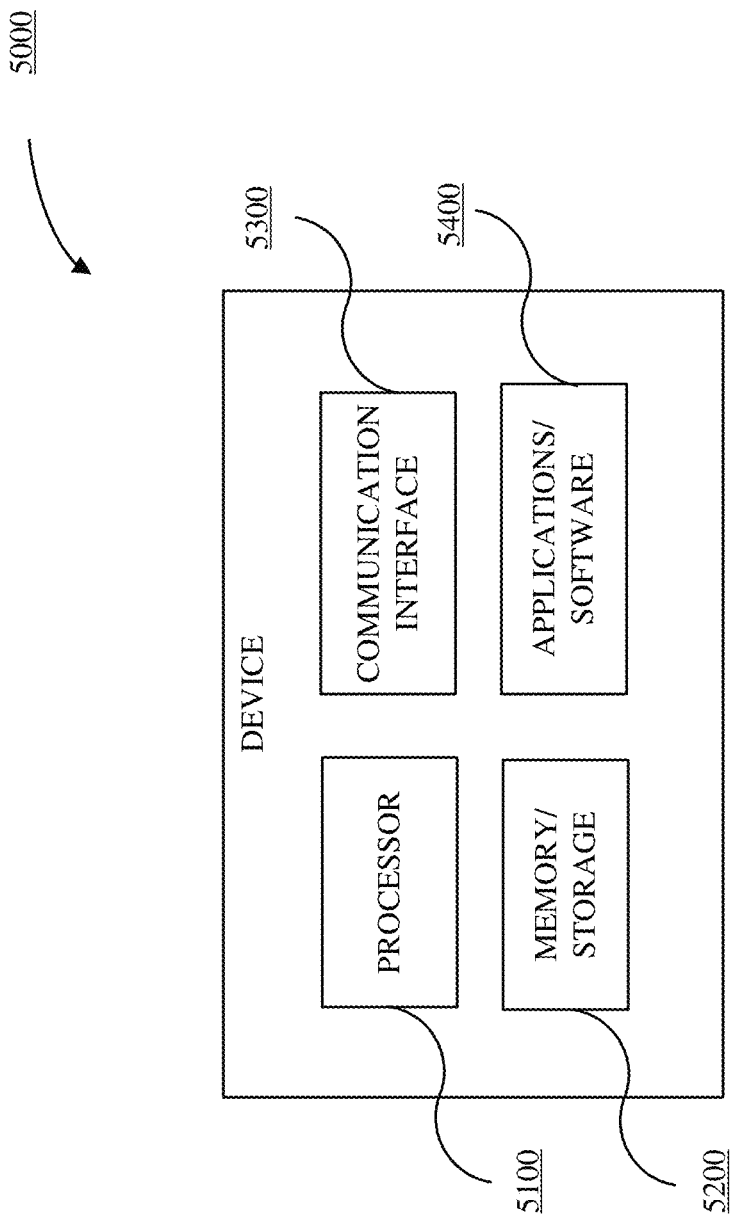
FIG. 5 is a block diagram of an example of a device in accordance with implementations of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the access control system 1400, the biometric recognition device 1410, the access control module 1420, the biometric recognition server 1430, the access control center 1440, the access control system 2000, the iris recognition device 2100, the access control module 2200, the iris recognition module 2110, the reference database 2120, the detection module 2130, the one or more image capturing device(s) 2140, the one or more illuminator(s) 2150, the controller 2160, the iris enrollment system 2170, the iris recognition server 3000, the provisional or enrollment database, the iris recognition module 3100, the reference database 3200, the controller 3300, the iris enrollment system 3400, the iris recognition module 4000, the eye finder module 4100 the iris finder module 4200, the iris encoder module 4300, and the iris matcher module 4400, for example. In an implementation, appropriate memory/storage 5200 may store user information, trusted credential data, the image(s), the iris information, the iris template(s), iris match scores, and stability scores. In an implementation, appropriate memory/storage 5200 is encoded with instructions for at least iris recognition, access control, and enrollment. The self-enrollment techniques or methods described herein may be stored in appropriate memory/storage 5200 and executed by the appropriate processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
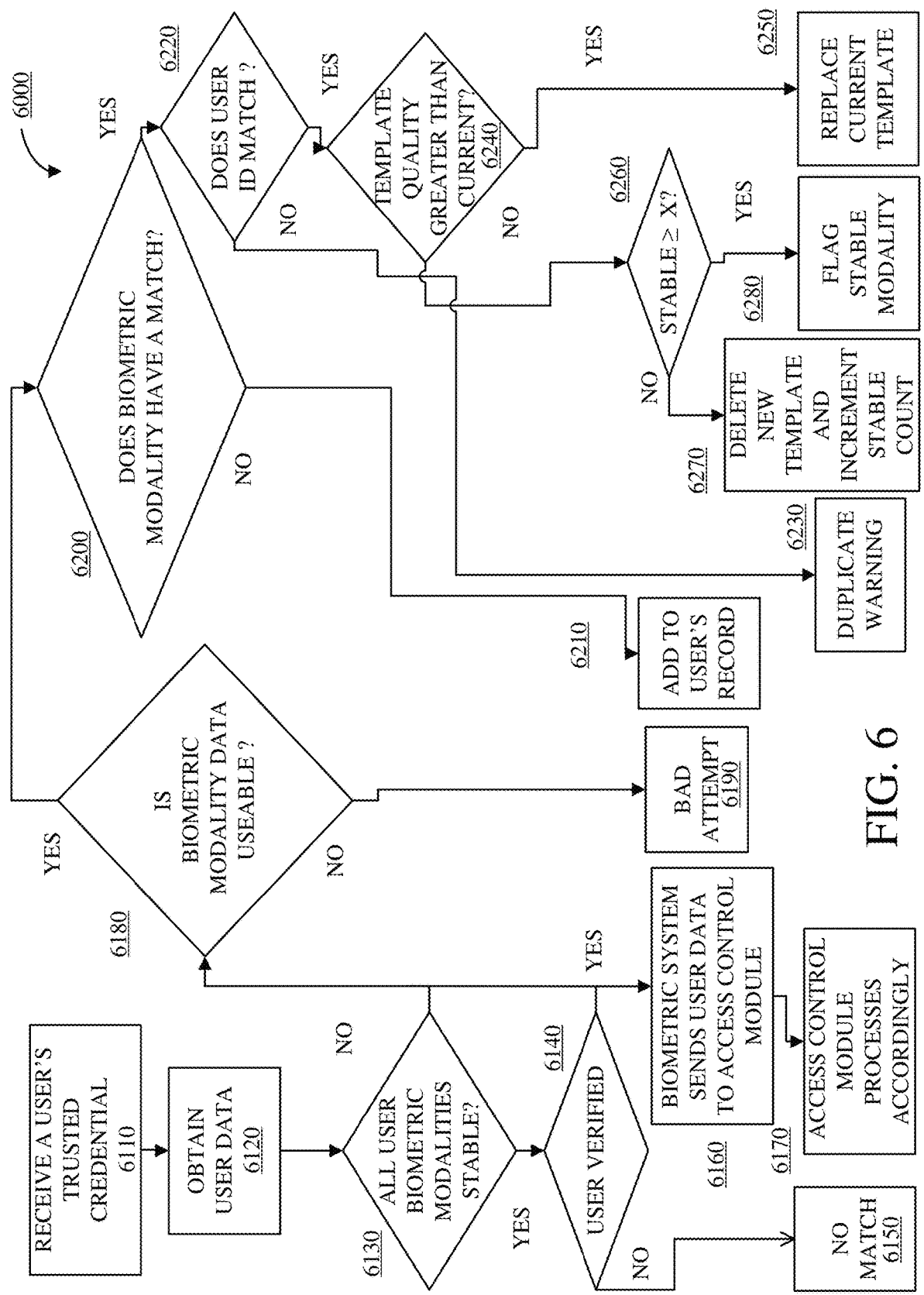
FIG. 6 is a diagram of example method for biometric self-enrollment in accordance with implementations of this disclosure.

FIG. 6 is a flowchart of an example method 6000 for biometric self-enrollment in accordance with implementations of this disclosure. The method 6000 includes: receiving 6110 a user's trusted credential; obtaining 6120 the user's data; determining 6130 whether a user's biometric modalities are stable; verifying 6140 the user when user's biometric modalities are stable; sending 6150 an alert when no user match; sending 6160 user data to access control module when user is verified; processing 6170 access for user as appropriate; determining 6180 whether biometric modality data is useable; indicating 6190 a bad attempt when the data biometric modality is not useable; determining 6200 whether each biometric modality have a match; adding 6210 to a user's record when no biometric match is found in database; determining 6220 whether user's ID (trusted credential) matches when a biometric match is found in database; indicating 6230 a duplicate record when user's ID does not match; determining 6240 whether quality of biometric template is better than currently stored template for the biometric modality when user ID matches; replacing 6250 current template with new template for the biometric modality when quality is greater; determining 6260 whether stability threshold is met or exceeded when quality is not greater; deleting 6270 new template and incrementing stability counter when stability count is not less than stability threshold; and flagging 6280 biometric modality as stable when stability count is met or greater than stability threshold. The method 6000 can be implemented using at least one of the access control system 1400, the biometric recognition device 1410, the access control module 1420, the biometric recognition server 1430, the access control center 1440, the access control system 2000, the iris recognition device 2100, the access control module 2200, the iris recognition module 2110, the reference database 2120, an enrollment database, the detection module 2130, the one or more image capturing device(s) 2140, the one or more illuminator(s) 2150, the controller 2160, the iris enrollment system 2170, the iris recognition server 3000, the iris recognition module 3100, the reference database 3200, the controller 3300, the iris enrollment system 3400, the iris recognition module 4000, the eye finder module 4100 the iris finder module 4200, the iris encoder module 4300, and the iris matcher module 4400, the device 5000, the processor 5100, the memory/storage 5200, the communication interface 5300, and the applications 5400, for example.

The method 6000 includes receiving 6110 a user's trusted credential. A first time user, a non-biometric modality enrolled user, or a user using a multi-factor system requiring a trusted credential initiates an access control system. In implementations, the trusted credential can be an RFID card, a one-time QR code, a PIN, a click on a link, interaction with a mobile application, or phone with Bluetooth or NFC, interaction via SMS or email, an existing biometric modality, and the like. In implementations, if a user record does not exist, a new user record is created.

The method 6000 includes obtaining 6120 the user's data. The access control system obtains the user's record based on the trusted credential and captures biometric modality data using biometric capture devices.

The method 6000 includes determining 6130 whether a user's biometric modalities are stable. The user's record or data includes stability flags or indicators for one or more biometric modalities. The stability flag indicates that a currently stored biometric modality template has not been replaced by a new template for the last X times, where X is a stability threshold. The new biometric credentials of all new users are initialized as not stable.

The method 6000 includes verifying 6140 the user when user's biometric modalities are stable. All biometric modalities that are used by the access control system are matched and verified with respect to the user's record and the captured biometric modality data when the biometric modalities are flagged as stable. That is, the captured biometric modality data is processed through appropriate biometric recognition devices as described herein. The processed captured biometric modality data is then matched against the stable biometric modalities of the user. The stable biometric modalities are stored, for example, in a reference database.

The method 6000 includes sending 6150 an alert when no user match. Alerts are sent to an access control system if no match is found. For example, access can be denied, security can be notified, and the like. That is, the processed captured biometric modality data does match the stable biometric modalities in the reference database.

The method 6000 includes sending 6160 user data to access control module when user is verified. The user record and data is sent to the access control module for further access processing when there are biometric modalities that are not stable or when the user is verified. The former allows a user to obtain access even though enrollment is pending and incomplete.

The method 6000 includes processing 6170 access for user as appropriate. For example, the access control module can grant access to a facility, an item, and the like.

The method 6000 includes determining 6180 whether biometric modality data is useable. The captured biometric modality data can be processed via an appropriate biometric recognition device to generate a biometric modality template as appropriate.

The method 6000 includes indicating 6190 a bad attempt when the captured biometric modality data is not useable. The captured biometric modality data cannot be used for recognition processing. The captured biometric modality data discarded. The user can be given access via the trusted credential as appropriate.

The method 6000 includes determining 6200 whether each biometric modality has a match. After biometric recognition processing, does the biometric modality template match a template in the reference database.

The method 6000 includes adding 6210 to user's record when no biometric match is found in database. If the biometric modality template does not match or exist in the user's record, add the biometric modality template to the user's record in an enrollment database.

The method 6000 includes determining 6220 whether user's ID (trusted credential) matches when a biometric match is found in database. If the biometric modality template matches a template in the database, determine if the user ID of the matching template is associated with the current user's ID.

The method 6000 includes indicating 6230 a duplicate record when user's ID does not match. If the matching template is not associated with the current user, an alert is given for a duplicate. That is, the biometric modality template matches a template in the reference and/or enrollment database but the user identifier for the matching template does not match the user's identifier which initiated this enrollment sequence. In this case, security can be alerted and the like.

The method 6000 includes determining 6240 whether quality of biometric template is better than currently stored template for the biometric modality when user ID matches. Metrics are used to determine whether a current template is better than a stored template. For example, quality metrics are measures of a biometric feature (iris, face, etc.) that suggest adequate information to encode as well as high likelihood of easy encoding. As an example, closed or narrowed eyelids would depress an iris quality score or a turned head or open mouth would depress face quality score.

The method 6000 includes replacing 6250 current template with new template for the biometric modality when quality is greater.

The method 6000 includes determining 6260 whether stability threshold is met or exceeded when quality is not greater. This checks the number of the times the stored template has been found to be better than subsequent templates.

The method 6000 includes deleting 6270 new template and incrementing stability counter when stability count is not less than stability threshold.

The method 6000 includes flagging 6280 biometric modality as stable when stability count is met or greater than stability threshold. When the stability threshold has been met, the stability flag for the biometric modality is set.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for seamless biometric self-enrollment, the method comprising:
  capturing, by a biometric capture device, biometric modality data for a user in response to a presentation of a user trusted credential for access to a resource during an enrollment process, wherein the user trusted credential enables access to the resource while enrolling the user into the enrollment process which uses the captured biometric modality data to generate a biometric modality that the user can use to access the resource when the biometric modality is stable;
  determining, by an enrollment system during the enrollment process, whether one or more biometric modalities for the user are stable;
  generating, during the enrollment process, a biometric modality template from the captured biometric modality data for each unstable biometric modality;

replacing, during the enrollment process, a matched stored biometric modality template with the biometric modality template when a first quality score of the biometric modality template is greater than a second quality score of the matched stored biometric modality template, wherein the first quality score and the second quality score are based on quality metrics associated with at least one biometric feature of the biometric modality;

performing, during the enrollment process, at least one stability process when the second quality score is greater than or equal to the first quality score;

repeating the capturing, the determining, the generating, the replacing, and the performing when the user attempts to access the resource by presenting the user trusted credential at each subsequent encounter during the enrollment process, wherein the enrollment process continues until a termination event occurs; and granting access with a biometric modality independent of the user trusted credential when a matched stored biometric modality template for the biometric modality is stable and verified, wherein stability indicates that a matched stored biometric modality template has not been replaced by a new biometric modality template for a defined number of access attempts by the user and the at least one stability process is a process for determining the stability of the matched stored biometric modality template.

2. The method of claim 1, the method further comprising:
receiving the user trusted credential, wherein the user trusted credential is at least one of a non-biometric credential and a biometric credential.

3. The method of claim 1, wherein performing the at least one stability process further comprises:
setting, during the enrollment process, a stability flag when the matched stored biometric modality template is unreplaced for the defined number of access attempts by the user.

4. The method of claim 3, wherein performing the at least one stability process further comprises:
deleting, during the enrollment process, the biometric modality template when the matched stored biometric modality template is at least qualitatively equal to the biometric modality template; and
incrementing, during the enrollment process, a stability counter associated with the matched stored biometric modality template.

5. The method of claim 1, the method further comprising:
determining, during the enrollment process, whether a user identifier for the matched stored biometric modality template matches a user identifier associated with the user trusted credential.

6. The method of claim 5, the method further comprising:
generating, during the enrollment process, a duplicate warning when the user identifier of the matched stored biometric modality template fails to match the user identifier associated with the user trusted credential.

7. The method of claim 1, the method further comprising:
adding, during the enrollment process, the biometric modality template to a user record in an enrollment database when the biometric modality template fails to match against a reference database.

8. The method of claim 1, the method further comprising:
discarding, during the enrollment process, the biometric modality data when an associated biometric recognition device is unable to process the biometric modality data.

9. The method of claim 8, the method further comprising:
generating, during the enrollment process, a bad attempt alert.

10. The method of claim 1, the method further comprising:
granting access using the user trusted credential when at least one biometric modality is unstable.

11. The method of claim 1, the method further comprising:
verifying biometric modality probes generated from the captured biometric modality data against respective stored stable biometric modalities.

12. The method of claim 11, the method further comprising:
granting access using at least one of the user trusted credential and biometric modality probes when verification passes.

13. An access system, comprising:
a biometric capture device configured to capture biometric modality data from a user presenting a trusted credential to the access system to access a resource during an enrollment process, wherein the trusted credential provides access to the resource during the enrollment process and at least until a stable biometric modality template is established for the user and wherein stable refers to a stored biometric modality template which has been unreplaced by a new biometric modality template for a defined number of encounters;

a memory configured to store at least the biometric modality data;

a biometric recognition device connected to the biometric capture device, the biometric recognition device configured to automatically generate a biometric modality template for each unstable biometric modality based on the captured biometric data; and an enrollment system connected to the biometric recognition device and the memory, the enrollment system configured to:
determine, during the enrollment process, whether a biometric modality for the user is stable;
replace, during the enrollment process, a matched stored biometric modality template with the biometric modality template when a first quality score of the biometric modality template is greater than a second quality score of the matched stored biometric modality template, wherein the first quality score and the second quality score are based on quality metrics associated with at least one biometric feature of the biometric modality;
perform, during the enrollment process, at least one stability process when the second quality score is greater than or equal to the first quality score, wherein the at least one stability process determine a stability of the matched stored biometric modality template;
repeat, at each subsequent encounter during the enrollment process where the user uses the trusted credential for access, the capture of biometric modality data, the generation of a biometric modality template for each unstable biometric modality, stability determination, replacement processing as appropriate, and stability processing while the enrollment process is active and at least one biometric modality template is unstable; and
initiate access processing with a biometric modality in lieu of the trusted credential when a matched stored biometric modality template for the biometric modality is stable and verified.

14. The access system of claim 13, the enrollment system further configured to:
receive the user trusted credential, wherein the user trusted credential is at least one of a non-biometric credential and a biometric credential.

15. The access system of claim 13, the enrollment system further configured to:
set a stability flag when the matched stored biometric modality template is unreplaced for the defined number of encounters by the user.

16. The access system of claim 15, the enrollment system further configured to:
delete the biometric modality template when the matched stored biometric modality template is at least qualitatively equal to the biometric modality template; and
increment a stability counter associated with the matched stored biometric modality template.

17. The access system of claim 13, the enrollment system further configured to:
determine whether a user identifier for the matched stored biometric modality template matches a user identifier associated with the user trusted credential.

18. The access system of claim 17, the enrollment system further configured to:
generate a duplicate warning when the user identifier of the matched stored biometric modality template fails to match the user identifier associated with the user trusted credential.

19. The access system of claim 13, the enrollment system further configured to:
add the biometric modality template to a user record in an enrollment database when the biometric modality template fails to match against a reference database.

20. The access system of claim 13, the enrollment system further configured to:
discard the biometric modality data when an associated biometric recognition device is unable to process the biometric modality data;
generate a bad attempt alert;
initiate access processing using the user trusted credential when at least one biometric modality is unstable; and
verify biometric modality probes generated from the captured biometric modality data against respective stored stable biometric modalities.

* * * * *